US012609862B2

(12) United States Patent
Banerjee et al.

(10) Patent No.: US 12,609,862 B2
(45) Date of Patent: Apr. 21, 2026

(54) ERRONEOUS DATA IN LEARNING AND INFERENCE OF COGNITIVE FUNCTIONS

(71) Applicant: Nokia Technologies Oy, Espoo (FI)

(72) Inventors: Anubhab Banerjee, Munich (DE);
Stephen Mwanje, Munich (DE);
Márton Kajó, Munich (DE)

(73) Assignee: Nokia Technologies Oy, Espoo (FI)

( * ) Notice: Subject to any disclaimer, the term of this patent is extended or adjusted under 35 U.S.C. 154(b) by 28 days.

(21) Appl. No.: 18/572,816

(22) PCT Filed: Jun. 28, 2021

(86) PCT No.: PCT/EP2021/067609
§ 371 (c)(1),
(2) Date: Dec. 21, 2023

(87) PCT Pub. No.: WO2023/274488
PCT Pub. Date: Jan. 5, 2023

(65) Prior Publication Data
US 2024/0297820 A1 Sep. 5, 2024

(51) Int. Cl.
H04L 41/0823 (2022.01)
H04L 41/08 (2022.01)
H04L 41/0816 (2022.01)

(52) U.S. Cl.
CPC ...... H04L 41/0823 (2013.01); H04L 41/0816 (2013.01); H04L 41/0886 (2013.01)

(58) Field of Classification Search
None
See application file for complete search history.

(56) References Cited

U.S. PATENT DOCUMENTS

| 2017/0024427 A1* | 1/2017 | Daly | G06F 16/2365 |
| 2020/0274877 A1* | 8/2020 | Kwatra | H04L 67/306 |
| 2022/0027789 A1* | 1/2022 | Banerjee | H04L 41/0873 |

FOREIGN PATENT DOCUMENTS

| WO | 2021/213644 A1 | 10/2021 |
| WO | 2022/174918 A1 | 8/2022 |

OTHER PUBLICATIONS

Banerjee et al., "Game theoretic Conflict Resolution Mechanism for Cognitive Autonomous Networks", International Symposium on Performance Evaluation of Computer and Telecommunication Systems (SPECTS), Jul. 20-22, 2020, 8 pages.
Banerjee et al., "RAN Cognitive Controller", arXiv, Oct. 20, 2020, 2 pages.

(Continued)

*Primary Examiner* — Atta Khan
(74) *Attorney, Agent, or Firm* — Barta Jones, PLLC

(57) ABSTRACT

It is provided a method comprising: receiving one or more received data sets, wherein each of the received data sets comprises data each representing a value of a respective status parameter of a system, and at least one of the data sets comprises a respective value quality score representing a quality of the value of the respective status parameter: calculating, by a cognitive function, an optimal configuration range set and a confidence score of the optimal configuration range set based on the one or more received data sets; providing the calculated optimal configuration range set and the confidence score to a controller.

8 Claims, 9 Drawing Sheets

(56) References Cited

OTHER PUBLICATIONS

Banerjee et al., "Optimal Configuration Determination in Cognitive Autonomous Networks", IFIP/IEEE International Symposium on Integrated Network Management (IM), May 17-21, 2021, pp. 494-500.

"Data Quality and Machine Learning: What's the Connection?", Talend, Retrieved on Jan. 17, 2024, Webpage available at : https://www.talend.com/resources/machine-learning-data-quality/.

Shrivastava et al., "DQA: Scalable, Automated and Interactive Data Quality Advisor", IEEE International Conference on Big Data (Big Data), Dec. 9-12, 2019, pp. 2913-2922.

Bosnić et al., "An overview of advances in reliability estimation of individual predictions in machine learning", Intelligent Data Analysis, vol. 13, No. 2, Apr. 1, 2009, pp. 1-24.

Saunders et al., "Transduction with Confidence and Credibility", IJCAI'99: Proceedings of the 16th international joint conference on Artificial intelligence—vol. 2, Jul. 31, 1999, pp. 722-726.

Bosnić et al., "Estimation of individual prediction reliability using the local sensitivity analysis", Applied intelligence, Aug. 3, 2007, pp. 187-203.

Kukar et al., "Reliable Classifications with Machine Learning", ECML '02: Proceedings of the 13th European Conference on Machine Learning, Aug. 19, 2002, pp. 219-231.

Bosnić et al., "Towards Reliable Reliability Estimates for Individual Regression Predictions", Computer Science, 2008, 1 page.

Gast et al., "Lightweight Probabilistic Deep Networks", IEEE/CVF Conference on Computer Vision and Pattern Recognition, Jun. 18-23, 2018, pp. 3369-3378.

Weigend et al., "Predictions with Confidence Intervals (Local Error Bars)", Colorado Univ at Boulder Dept of Computer Science, Jan. 1, 1994, pp. 1-6.

Adomavicius et al., "Improving Reliability Estimation for Individual Numeric Predictions: A Machine Learning Approach", INFORMS Journal on Computing, vol. 34, No. 2, Mar. 2021, 31 pages.

Ross, "Mutual information between discrete and continuous data sets", PLoS ONE, vol. 9, No. 2, Feb. 19, 2014, pp. 1-5.

International Search Report and Written Opinion received for corresponding Patent Cooperation Treaty Application No. PCT/EP2021/067609, dated Feb. 25, 2022, 14 pages.

"Experiential Networked Intelligence (ENI); System Architecture", ETSI GS ENI 005, V2.0.29, May 2021, pp. 1-173.

Office action received for corresponding European Patent Application No. 21737410.7, dated Nov. 11, 2024, 5 pages.

Office action received for corresponding European Patent Application No. 21737410.7, dated Jan. 27, 2025, 3 pages.

* cited by examiner

Dataset

|  | Time | UE_ID | Measurement types | |
|---|---|---|---|---|
|  |  |  | THRP | RSRP |
| Observation/record 1 | 16:30 | 001 | 70 Mbit/s | -40 dBm |
| Observation/record 2 | 16:31 | 001 | 65 Mbit/s | -38 dBM |
| Observation/record 3 | 16:32 | 001 | 10 Mbit/s | -30 dBm |

Value Quality Scores (VQS)

|  | Time | UE_ID | VQS per Measurement type | |
|---|---|---|---|---|
|  |  |  | THRP | RSRP |
| ad Observation/record 1 | 16:30 | 001 | 0.95 | 0.85 |
| ad Observation/record 2 | 16:31 | 001 | 0.97 | 0.90 |
| ad Observation/record 3 | 16:32 | 001 | 0.65 | 0.40 |

Receive sets of [OCRS, CCS]

S20

Calculate new parameter value based on sets of [OCRS, CCS]

S30

Apply new parameter value

10

20

30

S110 — Receive sets of [parameter values, VQS]

S120 — Calculate OCRS and CCS based on sets of [parameter values, VQS]

S130 — Provide OCRS, CCS

110

120

130

810

820

ERRONEOUS DATA IN LEARNING AND INFERENCE OF COGNITIVE FUNCTIONS

RELATED APPLICATION

This application claims priority to PCT Application No. PCT/EP2021/067609, filed on Jun. 28, 2021, which is incorporated herein by reference in its entirety.

FIELD OF THE INVENTION

The present disclosure relates to cognitive autonomous networks. In particular, it is related to erroneous data which may be input into cognitive functions.

ABBREVIATIONS

3GPP $3^{rd}$ Generation Partnership Project
4G/5G/6G $4^{th}/5^{th}/6^{th}$ Generation
AI Artificial Intelligence
CAN Cognitive Autonomous Network
CCS CF Confidence Score
CF Cognitive Function
CT CCS Threshold
CW Configuration Weight
EG(S) Eisenberg-Gale (Solution)
GPS Global Positioning System
IE Information Element
KPI Key Performance Indicator
ML Machine Learning
MLA Machine Learning Algorithm
MLB Mobility Load Balancing
MNO Mobile Network Operator
MSE Mean Square Error
NAF Network Automation Function
NN Neural Networks
OCRS Optimal Configuration Range Set
QoE Quality of Experience
RAN Radio Access Network
RSRP Reference Signal Received Power
SF SON Function
SGD Stochastic Gradient Descent
SINR Signal over Interference and Noise Ratio
SON Self Organizing Network
SVM Support Vector Machine
THRP Throughput
TXP Transmit Power
UE User Equipment
UF Utility Function
VQS Value Quality Score

BACKGROUND

In mobile networks (e.g. in 5G), rule-based network automation has been successfully introduced by Self Organizing Networks (SON). The NAFs in SON (also called SON Functions (SF)) are limited in two aspects—(i) they cannot adapt themselves in a rapidly changing environment because of their hard-coded behavior, and, (ii) existence of a large number of rules makes maintenance and upgrade of the system difficult.

Cognitive Autonomous Networks (CAN) are being promoted to replace SON by replacing the SFs with Cognitive Functions (CFs). These CFs are learning agents—they act based on their learning and do not follow any fixed set of rules. As a learning agent, a CF can determine the best network configuration for its control parameter(s) in a certain network state. However, because the CFs operate in a shared environment, they access network resources through a controller (see FIG. 1.) that is responsible for managing the access to the network resources, specifically for minimizing the competition for access to and for the values of the network parameters.

The working principle of a CF may be simple and straightforward: the CF periodically (or triggered by a certain event) checks if the network state has changed. This period is denoted as a cycle. If it has not, then it continues with its learning. Otherwise, it computes the desired optimal values of its input configurations and checks them with the values set at the system. If they are the same, the CF does nothing and continues learning, otherwise, the CF (called the Requesting CF, as shown in FIG. 2.) initiates a process to implement the desired configuration using two values: the Optimal Configuration Range Set (OCRS) which is a set of values of the specific configuration parameter for which the objective of the CF is optimal or close to optimal, and the Utility Function (UF) which maps the output of a CF to a universal predefined scale like [0:10]. In this respect, the CF detects those configurations which are currently not optimal, generates corresponding OCRS and UF and sends them to the Controller with a request to recalculate the configuration value. The Controller requests all CFs to send their OCRS and UF, calculates the value which is optimal for the combined interest of the system ([1], [2]) and sets this value in the network. This abstraction is depicted in FIG. 1, while the procedure is illustrated by FIG. 2. Dashed line boxes indicate actions involving multiple entities.

As it is clear from the operational procedure of the CAN, the final value calculation of a control parameter depends on each OCRS and UF proposed by the CFs. A CF generates the OCRS and UF for a configuration based on its learning from network data. So, if the data is not complete or erroneous, OCRS and UF generated by a CF are also not accurate.

To the best knowledge of the inventors, the only existing relevant prior research works are our previous patent applications [1], [2] and research papers [3], [5], [6]. Invention [1] proposes how to find a good compromise in case of a conflict among the CFs and find a value which is optimal for the combined interest of the system. In [2] this idea was extended when individual interests of CFs on a particular configuration were taken into account while calculating the final value of the configuration. Interest of a CF on a particular configuration is quantified as configuration weight (CW) and the final optimal value is calculated using Eisenberg-Gale (EG) solution.

In these publications, it has been assumed that the CFs are utilizing trustworthy, non-erratic data from the network for their learning and inference. However, as stated before, this might sometimes not be the case in reality.

Relatedly, in AI/ML there exist some research works which partially address the data quality issue. The estimation of data quality is a somewhat well-researched subject already, both on the datasets themselves, and also on the outputs of ML algorithms.

Neural networks are prevalent in many ML application, because of their versatility and cognitive power [6]. This versatility allows for the implementation of the inference accuracy score output in an uncomplicated way.

Neural networks are trained in a stepwise, repetitive manner; a subset (a batch) of the training data is first forward propagated through the net, in order to be able to measure the error of the output compared to the ground truth. The error can be defined differently for different tasks, the function through which the error is quantified is called the loss function (from here on referred to as task loss function, or $f_{Itask}$), the quantified error is often referred to as loss (from here on referred to as task loss, or $l_{task}$). After the task loss is calculated, it is propagated backwards through the network in order to calculate how much each internal parameter in the net has to be changed to lower the loss. After this, the internal parameters are changed by a small amount, so that the loss is a little smaller. This process, called Stochastic Gradient Descent (SGD), is repeated many times during training, so that by the end the internal parameters barely change at all. At this point the internal parameters have converged to an optimum, and the training is stopped.

REFERENCES

[1] US provisional application U.S. 63/056,084: "AN INTEREST BASED OPTIMAL CONFIGURATION CALCULATION MECHANISM IN COGNITIVE AUTONOMOUS NETWORKS".
[2] PCT/EP2020/061183 "A COORDINATION AND CONTROL MECHANISM FOR CONFLICT RESOLUTION FOR COGNITIVE FUNCTIONS".
[3] A. Banerjee, S. S. Mwanje and G. Carle, "Game theoretic Conflict Resolution Mechanism for Cognitive Autonomous Networks," 2020 International Symposium on Performance Evaluation of Computer and Telecommunication Systems (SPECTS), Madrid, Spain, 2020, pp. 1-8.
[4] PCT/EP2021/054165 "DESIGN OF A ENERGY SAVINGS MODE OF OPERATION FOR COGNITIVE AUTONOMOUS NETWORKS".
[5] Banerjee, A., Mwanje, S. S., & Carle, G. (2020). RAN Cognitive Controller. arXiv preprint arXiv:2010.10278.
[6] Banerjee, A., Mwanje, S. S., & Carle, G. (2021). Optimal Configuration Determination in Cognitive Autonomous Networks. 2021 IFIP/IEEE Symposium on Integrated Network and Service Management (IM), Bordeaux, France, 2021.
[7] Ross, Brian C. "Mutual information between discrete and continuous data sets." *PloS one* 9.2 (2014): e87357.

SUMMARY

It is an object of the present invention to improve the prior art.

According to a first aspect of the invention, there is provided an apparatus comprising: one or more processors, and memory storing instructions that, when executed by the one or more processors, cause the apparatus to perform: receiving, for a control parameter of a system, from each of plural cognitive functions, a set of a respective optimal configuration range set and a respective confidence score of the respective optimal configuration range set; calculating a new value for the control parameter based on the received optimal configuration range sets and the confidence scores; applying the new value of the control parameter to the system.

According to a second aspect of the invention, there is provided an apparatus comprising: one or more processors, and memory storing instructions that, when executed by the one or more processors, cause the apparatus to perform: receiving one or more received data sets, wherein each of the received data sets comprises data each representing a value of a respective status parameter of a system, and at least one of the data sets comprises a respective value quality score representing a quality of the value of the respective status parameter; calculating, by a cognitive function, an optimal configuration range set and a confidence score of the optimal configuration range set based on the one or more received data sets; providing the calculated optimal configuration range set and the confidence score to a controller.

According to a third aspect of the invention, there is provided a method comprising: receiving, for a control parameter of a system, from each of plural cognitive functions, a set of a respective optimal configuration range set and a respective confidence score of the respective optimal configuration range set; calculating a new value for the control parameter based on the received optimal configuration range sets and the confidence scores; applying the new value of the control parameter to the system.

According to a fourth aspect of the invention, there is provided a method comprising: receiving one or more received data sets, wherein each of the received data sets comprises data each representing a value of a respective status parameter of a system, and at least one of the data sets comprises a respective value quality score representing a quality of the value of the respective status parameter; calculating, by a cognitive function, an optimal configuration range set and a confidence score of the optimal configuration range set based on the one or more received data sets; providing the calculated optimal configuration range set and the confidence score to a controller.

Each of the methods of the third and fourth aspects may be a method of mitigating errors.

According to a fifth aspect of the invention, there is provided a computer program product comprising a set of instructions which, when executed on an apparatus, is configured to cause the apparatus to carry out the method according to any of the third and fourth aspects. The computer program product may be embodied as a computer-readable medium or directly loadable into a computer.

According to some embodiments of the invention, at least one of the following advantages may be achieved:
erroneous information propagation may be mitigated;
missing data from the system may be correctly handled;
critical inputs may be recognized;
trust in decisions by CFs may be improved.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein:

FIG. 5 shows a dataset and a corresponding set of VQS values used in some example embodiments of the invention;

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

Some example embodiments of the invention deal with the technical problem to calculate optimal configurations in CAN if the input values are not accurate (not complete or erroneous).

The existing prior art assumes a static context. They process large amounts of data offline and do not intend to meet dynamic control decisions. They usually only consider attaching data quality indicators to a whole dataset or measurements. This is not useful in a dynamic decision scenario like in cognitive control as the required data and correspondingly the quality knowledge needs to be varied with state of the system.

Figure 1:
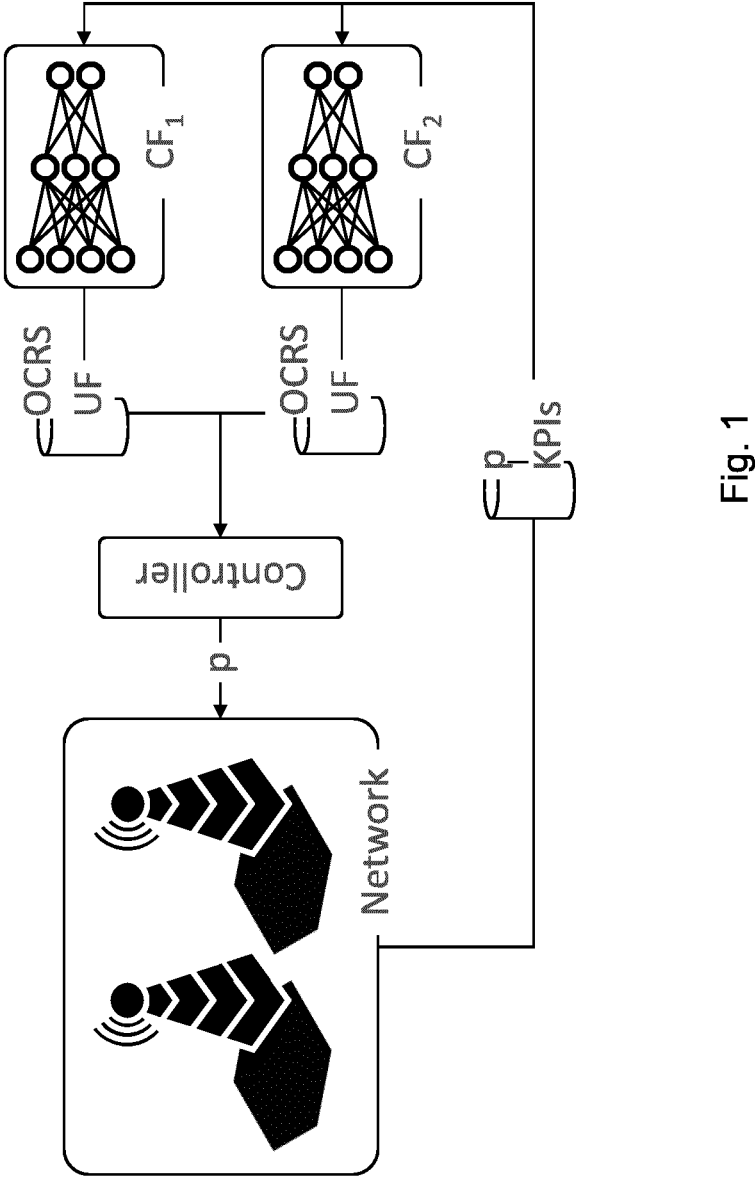
FIG. 1 shows an overview of a CAN and related information propagation.
Figure 2:
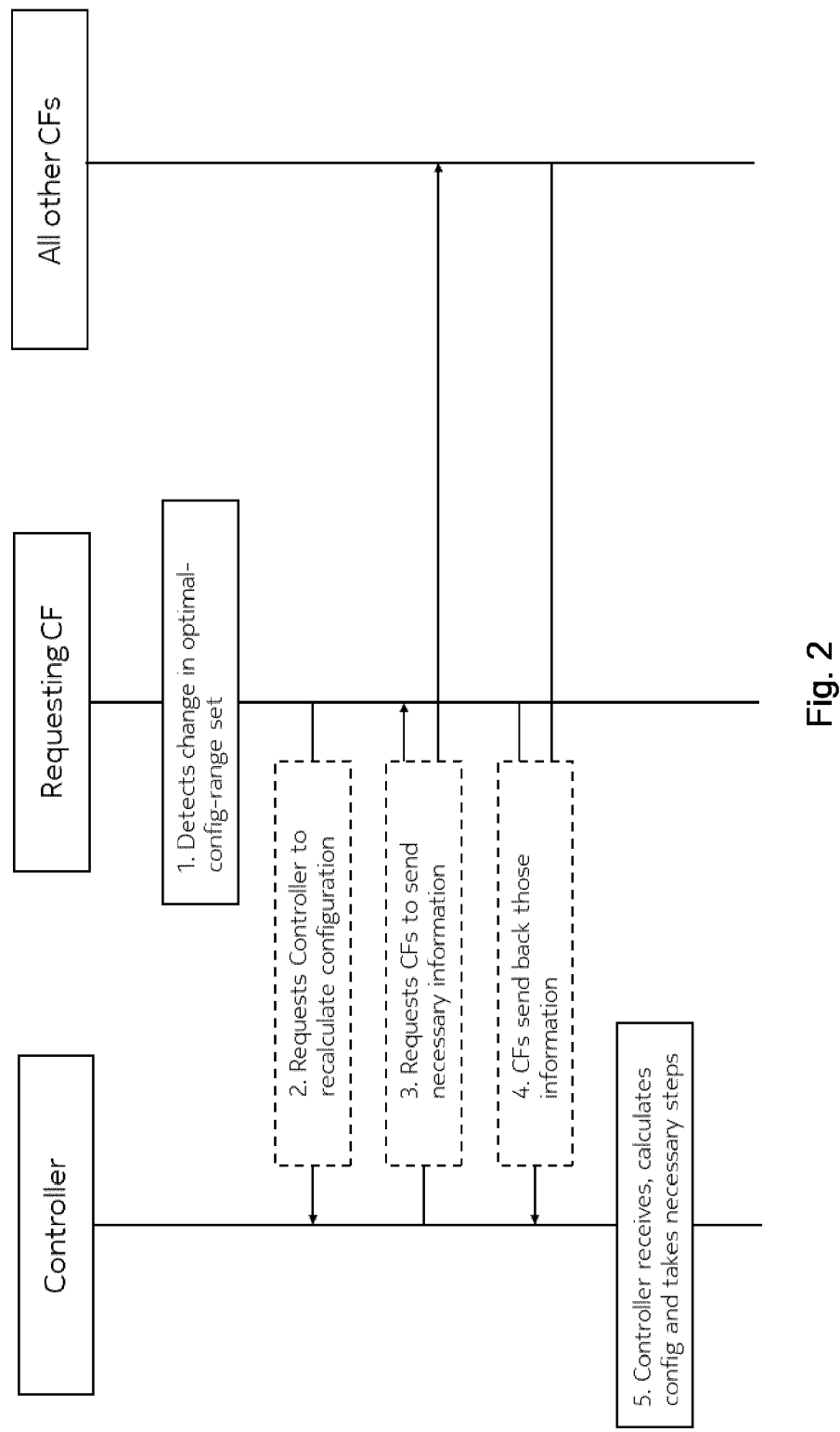
FIG. 2 illustrates a procedure for optimal (or nearly optimal) configuration calculation in CAN.

Let us assume a CAN with two CFs-$CF_1$ and $CF_2$, and one Controller, as shown in FIG. 1. Let us assume that there is one control parameter p which both of the CFs share. A relevant real-life example is the case where mobility load balancing (MLB) and coverage and capacity optimization (CCO) may both share full bandwidth transmit power (TXP) to respectively control overload by reducing cell size through the reducing of TXP and minimize coverage gaps by increasing the TXP. The CAN is deployed in a real-life scenario where the network state (or, external environment) changes from time to time. As already mentioned in prior art [1], [2] and [3], the CFs continuously (periodically, from time to time) observe the network states, learn from it and act based on the learning.

Traditionally, the machine-learning-based $CF_1$ and $CF_2$ are trained on data that have good quality, i.e., data that was collected when the network was working correctly, to represent an envisioned 'optimal' context in which the CF is meant to operate. Usually, good quality data does not contain any erroneous data. Erroneous data may stem from e.g.:

Imprecise measurements, which contain added noise (such as RSRP, SINR, or QoE estimations).

Missing values or missing entire records, because of communication failures, such as radio link failures.

Records which are communicated with a significant delay.

In absence of these inconsistencies, the output of a CF may depend on a few precise inputs, and the CF does not need to exploit the redundancy present in the training data. However, during inference, CFs are very likely to come across these inconsistencies in p. When this happens, CFs show high error in their inference outputs, even if redundant and uncorrupted data is available from other sources.

Figure 3:
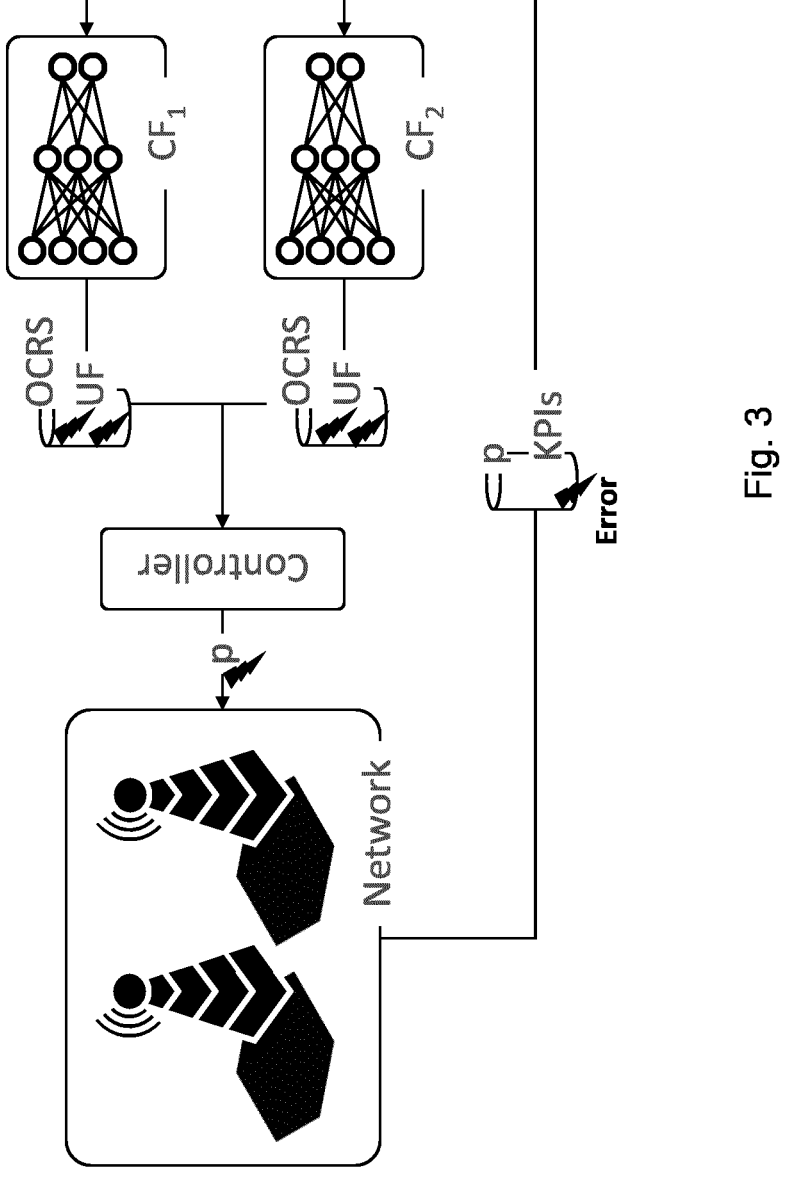
FIG. 3 shows propagation of erroneous information in CAN.

FIG. 3 illustrates the propagation of erroneous data throughout the system. FIG. 3 corresponds to FIG. 1, but the potential errors are additionally indicated by flashes. Namely, the KPIs reported from the network to the CFs may be erroneous. Consequently, one or both of OCRS and UF provided from the CFs to the controller may be erroneous. Still consequently, the value of the control parameter p newly calculated by the controller may be erroneous, too, which (of course) might have an adverse effect on the performance of the network.

The challenge then, is how should the CAN system be revised to account for errors and inconsistencies in the input data and how should the controller deal with decisions that are made based on such erroneous and inconsistent data? Some example embodiments of the invention solve this problem as follows:

1) undertake the training in a way that prepares the CFs to deal with these inconsistencies; and 2) make the necessary changes in the Controller to also account for the possibility of erroneous input data into the CFs.

Some example embodiments of the invention provide a solution to the issue of CF performance degradation that may result from insufficient and erratic network data. Specifically, some example embodiments of the invention address one or both of the following two problems:

1) In CAN, before a CF is put into operational mode, it is trained with good quality network data which can either be obtained from real systems or be generated using a simulator. However, in the operational mode the data used by the CF is not guaranteed to be of such good quality. The data can be erroneous or incomplete, each of which significantly affects the operational efficiency of a CF.

2) In CAN, optimal value of a configuration is calculated based on the suggestions of all the CFs in the system and these suggestions are generated by the CFs based on their inference, which gets affected significantly in presence of incomplete or erroneous data. So, if one or multiple of the CFs have lower operational efficiency due to inadequate training, it affects the process of optimal configuration and, as a result, performance of the whole system might degrade.

Some example embodiments of the invention address such operational inefficiency of one or multiple CFs. According to some example embodiments of the invention, the estimated quality of the information going in and going out of CFs is signalled both during training and during inference. This means that, in case of imperfect data, the input to the CFs during training includes imperfect data as well as an indication of the estimated degree of confidence in that data. Then, for each computed output from each CF, the CF indicates a estimated degree of confidence in the computed decision. This CF output and the related estimated degree of confidence are then the input submitted to the controller for computing the shared-parameter configuration values. Correspondingly, the controller may have the capability to treat the input information differently depending on the indicated degree of confidence.

To make CFs robust against erratic data, some example embodiments of the invention provide at least one of:

a) An input interface for the CFs, which is used to communicate the dependability/quality of raw measurements and/or KPIs from the network:

The numerical value that represents the dependability/ quality of a given observation and measurement type may be called the Value Quality Score (VQS). VQS represents the amount of useful information against the amount of noise in the measurement. A typical scale for the VQS may be the unit scale from 0.0 through 1.0 although other scales may also be applicable. For the scale [0.0-1.0], a VQS of 1.0 represents a perfect measurement, which does not contain any noise, while a VQS of 0.0 represents a measurement that has nothing to do with the actual truth, and only contains noise. A VQS of 0.0 can also mean a missing measurement, in which case the actual missing measurement can be replaced by any placeholder number, such as 0, or a random number.

The VQS is typically communicated together with every measurement. It may be communicated by an additional data structure, which accompanies the communicated measurement data. As another option, the VQS may be included as an additional IE in the existing data structure. This additional data can contain the VQS for all measurements in the dataset, or can contain VQS values for only a subset of the measurement types. FIG. 5 shows on top the conventional data structure ("data set") indicating for a UE measurement values of some example parameters (here: THRP and RSTRP) over time. On bottom, the additional data structure indicating the value quality score for each measurement is shown. For example, the THRP measurement 70 Mbit/s at 16:30 h has a VQS of 0.95.

If a VQS value is communicated for a measurement type, it should preferably be present for every observation; having the VQS value for some observations but not for others defeats the exact purpose of the VQS score, by re-introducing untraceable uncertainty into the system.

b) An interface between the Controller and the CFs is used to communicate the dependability/quality of the inferred information on the output side of the CFs:

The CF confidence score or CCS effectively works as the VQS value but is generated by the CF to represent the dependability of (confidence in) in its own inference. The CF sends CCS to the Controller with each set of [OCRS, UF].

When a configuration is to be recalculated, the Controller sends a request to all the CFs for their latest OCRS and UF. After a CF receives a request, it sends OCRS and UF, along with the CCS, to the Controller.

The Controller receives [OCRS, UF, CCS] from all the CFs. In some example embodiments, the controller discards those [OCRS, UF] sets with CCS value below a first threshold. This threshold, called CCS threshold (CT), can be set by the MNO beforehand and the Controller can obtain it directly from the MNO. In some example embodiments, the controller may discard one or more [OCRS, UF] having the lowest CCS among all the CCS. In some of these example embodiments, the controller may discard the one or more [OCRS, UF] with the lowest CCS only if the lowest CCS is below a second threshold. In some example embodiments, the controller may discard [OCRS, UF] having a CCS below the first threshold, and in addition, one or more [OCRS, UF] having the lowest CCS. If in such embodiments the second threshold is taken into account, the second threshold may be different from (e.g. higher than) the first threshold.

After discarding one or more [OCRS, UF] sets, if any, as described above, the Controller calculates the associated CW values and calculates an optimal (or nearly optimal) configuration (i.e., a new value of the configuration parameter p, wherein the "new value" may potentially be the same as the "old value"), and applies the calculated optimal (or nearly optimal) configuration to the system (network).

c) A training method that emulates degraded data during training and VQS inputs, thus conditioning the CF to be robust against these data degradations, as well as training the CF to output CCS values on its own:

Conventionally, for training, good quality datasets should be used, which means the true VQS values should be close to 1.0 (i.e. larger than a predefined threshold, e.g. larger than 0.95 or 0.98). Training an ML based CF on already heavily compromised data will not lead to good accuracy, as the missing information prevents the ML algorithm to form precise rules, even if the low quality is signaled.

During training, emulated noise is added to the training dataset (with randomly varying amounts), and the amount of the added noise is represented in the correspondingly generated VQS values, which are also fed to the CF. The CF can learn to weigh inputs differently depending on their VQS, so that less noisy inputs are preferred to more noisy inputs if they provide overlapping information.

To be able to output CCS values, the CF may estimate its own VQS on the output (even while the emulated noise is present on the inputs). As the training set—by definition—contains the correct outputs for the training observations, the true VQS values of the outputs can be calculated, and the MLA can be trained to best estimate these values.

Figure 4:
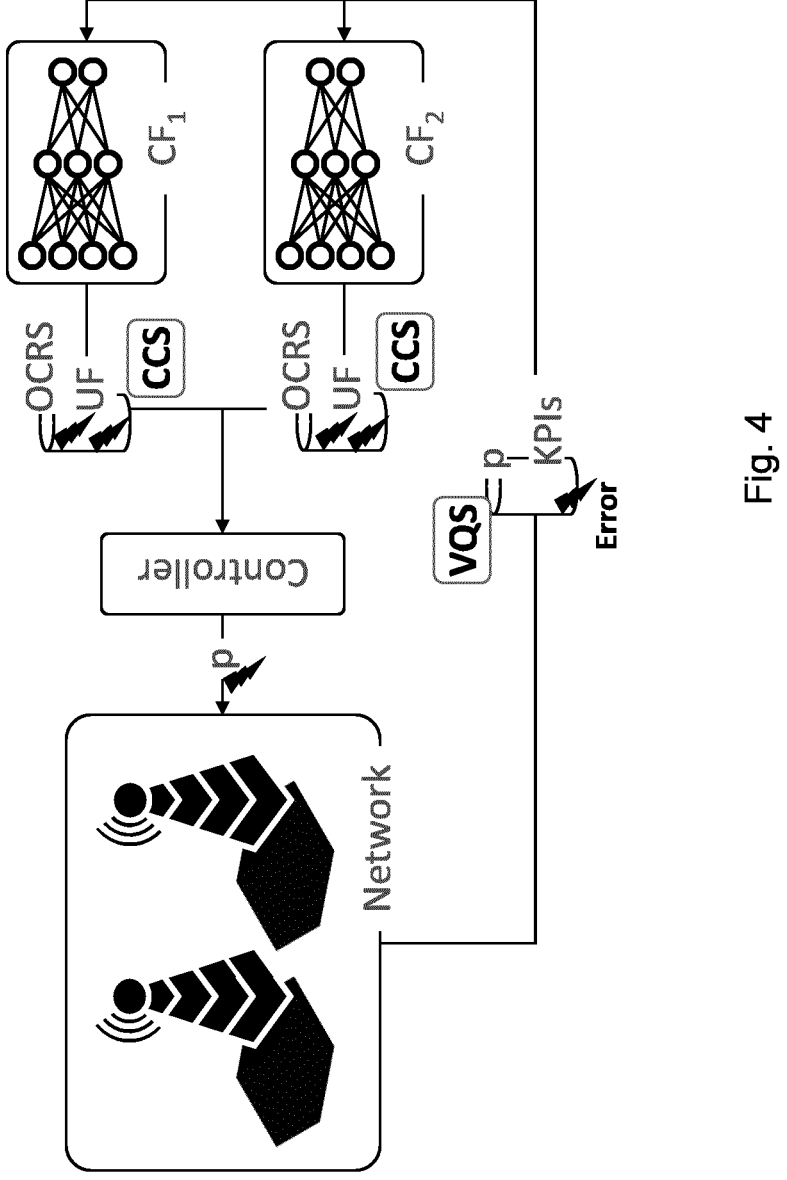
FIG. 4 shows a CAN according to some example embodiments of the invention.

FIG. 4 corresponds to FIGS. 1 and 3 and illustrates how the propagation of erroneous (or missing) data is mitigated in some example embodiments of the invention. Namely, the inputs to the CFs (KPIs or parameter values from the network) are accompanied by a respective VQS indicating the quality of the indicated KPI (or parameter value). The output from the CFs (i.e. OCRS, UF) is accompanied by a respective CCS, indicating the quality of the output from the CF.

Hereinafter, some aspects of some example embodiments of the invention are described at greater detail. Each of these aspects may be employed in one or more of the example embodiments of the invention, independent on if another of these aspects is employed in the respective example embodiment, too.

VQS and CCS Values

Generally, any measure of quality (accuracy, dependability, or confidence) should be unbounded in one direction (half-bounded), as any data can contain an arbitrarily large amount of error compared to the absolute 'truth'. There is no limit to "wrongness", however, there is a limit to "rightness", which is when the measurement is perfectly accurate, having 0 error compared with the truth.

This half-boundedness could pose a problem with the usability of the VQS and CCS as the Controller uses CCS to calculate optimal configuration for the system. Using the absolute value of the error and this as a value quality score is difficult to interpret, because depending on the expected range of the value, the same amount of average error (let's say 0.1) could mean an entirely wrong measurement (because the expected range is [−0.01, 0.01]), or a very precise measurement (because the expected range is [−100, 100]). I.e., the absolute error between the truth and the erroneous value should not be used as a measure of wrongness. The scale for VQS and CCS should be independent from the range of the values being measured, as explained hereinafter, for example.

Both the VQS and CCS effectively represent the same thing: the quality (accuracy, dependability, or confidence) of the information. Some example embodiments of the invention employ a quality score that is based on normalized mutual information content or correlation (between the values and the ground truth). These types of metrics are bounded between two extremes, such that (as an example):

0.0 value quality score means no correlation between measurement and truth, thus signifying that the data is wholly undependable, and contains no information about the actual truth.

1.0 value quality score means full correlation between measurement and truth, thus signifying that the data can be used to perfectly tell the ground truth.

In general, measures of mutual information content are insensitive to scaling or translation. Therefore, in the above formulation, a 1.0 VQS typically does not mean, that the measurement equals the ground truth, it only means that it "behaves similar to it". This uncertainty, however, should not pose a big problem, as ML algorithms are trained to infer the ground truth (correct output), and only additionally to also predict the inference accuracy, in which setting a 1.0 accuracy will also correspond to 0 absolute error in the output.

Learning to generate the CCS is explained in the next section, but accessing VQS is not that straight-forward, as it has to be generated at the origin where the network KPI (parameter value) is measured and/or estimated. In some example embodiments, depending on the type of the measurement, VQS may be estimated as follows:

Heuristics: The quality of the data is known depending on external circumstances, or the measured values:

Example 1: In case of variable rate data compression, the data could have a varying amount of noise, which is tied to the amount of compression.

Example 2: Temperature sensors have a pre-defined level of noise in their measurement, which changes according to the measured temperature.

Fixed parameter: The quality of the measurements is a fixed, unchanged value independent on external factors:

Example 1: GPS position coordinates (in the planar direction, but not vertically) have a known amount of jitter, which was identified during the design of the system, and the amount remains unchanging if the system is working correctly.

No quality info available: If this information is not available in any form, reporting of VQS can be left out for the measurement. For example, one may report a placeholder value VQS=1.0. If the placeholder value of 1.0 is reported for VQS, in case of missing data, the VQS can still be changed to 0.0, thus signaling at least completely missing measurements.

Additionally, the following criteria for VQS should preferably be observed:

VQS presence should be consistent between training and inference datasets, i.e.: CFs typically handles VQS correctly for measurement types for which it had the VQS during training, and vice-versa, having VQS during training but not during inference may be misleading from the standpoint of the CFs.

If a CF requires VQS which can not be provided temporarily for certain measurement types, a VQS of 1.0 can be used as a placeholder in these cases (following the consistency requirements explained in the previous point). In this case, the CF has to be also trained on these placeholder VQS values. This could also be the case if a neural net topology is used in other CF instances to good effect, but in this specific instance the VQS values are not accessible.

Example Implementation of the Modified Training of an ML Based CF

In this section, an example implementation of training for VQS input and CCS output in the case of the CF being a neural network (both accepting VQS values as inputs and predicting CCS values as output) is explained, based on the training principle explained in the prior art section.

Let us consider a case, where a neural network is already defined for a certain task, as well as the corresponding task loss function, and training data is available. The following actions may be performed to extend the SGD framework to also train the neural network to accept VQS values as inputs:

1. First, the topology of the neural network has to be changed, so that for each input value $I_i$, an additional VQS value $VQS_i$ can also be input. This essentially doubles the number of inputs the neural network has.

2. The training data should contain VQS values that are close to 1.0 (larger than a predefined threshold such as 0.95 or 0.98). During training, for each batch input into the NN, the inputs $I$ may be disturbed by mixing the inputs by a random amount ($m_r$) with synthesized values $I_s$, which follow the same distribution as the input values, resulting in noisy input values $I_n$:

$$I_n = I_i * m_r + I_s * (1 - m_r)$$

3. The value $VQS_i$ should be calculated on the input dataset (per batch), by measuring the mutual information MI between the non-noisy original inputs $I$ with the noisy inputs $I_n$:

$$VQS_i = MI(I, I_n)$$

Here, the mutual information MI may be determined as explained in information theory. In information theory, mutual information of two random variables is the measure of relatedness between them, i.e., to what degree the two variables are related with one another. If X and Y are two random variables with marginal distributions $P_X$ and $P_Y$, and if their joint distribution is $P_{(X,Y)}$, then the mutual information can be calculated as $$I(X;Y) = D_{KL}(P_{(X,Y)} \| P_X \otimes P_Y),$$

where $D_{KL}$ is Kullback-Leibler divergence.

If X and Y are two discreet datasets, then the mutual information can be calculated from the statistics of the (x,y) pairs between the two data sets, following the method described in [7]. If X and Y are both discrete, then we can estimate the true frequencies of all combinations of (x,y) pairs by counting the number of times each pair occurs in the data, and straightforwardly use these frequencies to estimate mutual information. Real-valued data sets are more difficult to deal with, since they are by definition sparsely sampled: most real numbers will not be found in a data set of any size.

The common workaround is to lump the continuous variables into discrete 'bins' and then apply this discrete mutual information estimator.

4. If the additional VQS information is useful in the task, the neural network will incorporate this into the learned rules without any additional changes, through the standard backpropagation of the $I_{task}$ during training.

For the training procedure, VQS input values are not strictly required. In other words, VQS can simply be calculated considering the synthesized values used to impose distortion on data.

In action 2, the generation/synthesis of randomly generated values can be undertaken through modelling the distribution of the original data:

For a simple method a Gaussian mixture model can be used.

For a more advanced method a Generative Adversarial Net (GAN) can be used, which can synthesize 'fake' values that look like they came from the original dataset.

In the same context, the SGD framework may be extended to also train the neural network to output CCS values, for example as follows:

1. First, the topology of the neural network is changed, so that for each output value $O_o$, an additional CCS value $CCS_o$ can also be output. This essentially doubles the number of outputs the neural network has.

2. A second loss function may be defined to measure the error in the CCS prediction, from here on referred to as $f_{lCCS}$. For example, the loss function may measure the prediction accuracy between predicted $CCS_o$ and the actual calculated $CCS_{co}$. $CCS_{co}$ may be calculated by measuring the mutual information between the MLA outputs $O_o$ and their corresponding ground truth $O_t$. Using $CCS_o$ and $CCS_{co}$, the loss value $I_{VQS}$ can be calculated, for example as (using the Mean Squared Error function):

$$I_{VQS} = MSE(MI(O_o, O_t), CCS_o)$$

3. During training, at the end of every forward propagation phase, $I_{task}$ and $I_{VQS}$ may be combined (added) together to arrive at a combined loss value $I_{comb}$, which can then be backpropagated through the neural network in the regular SGD fashion.

Figure 6:
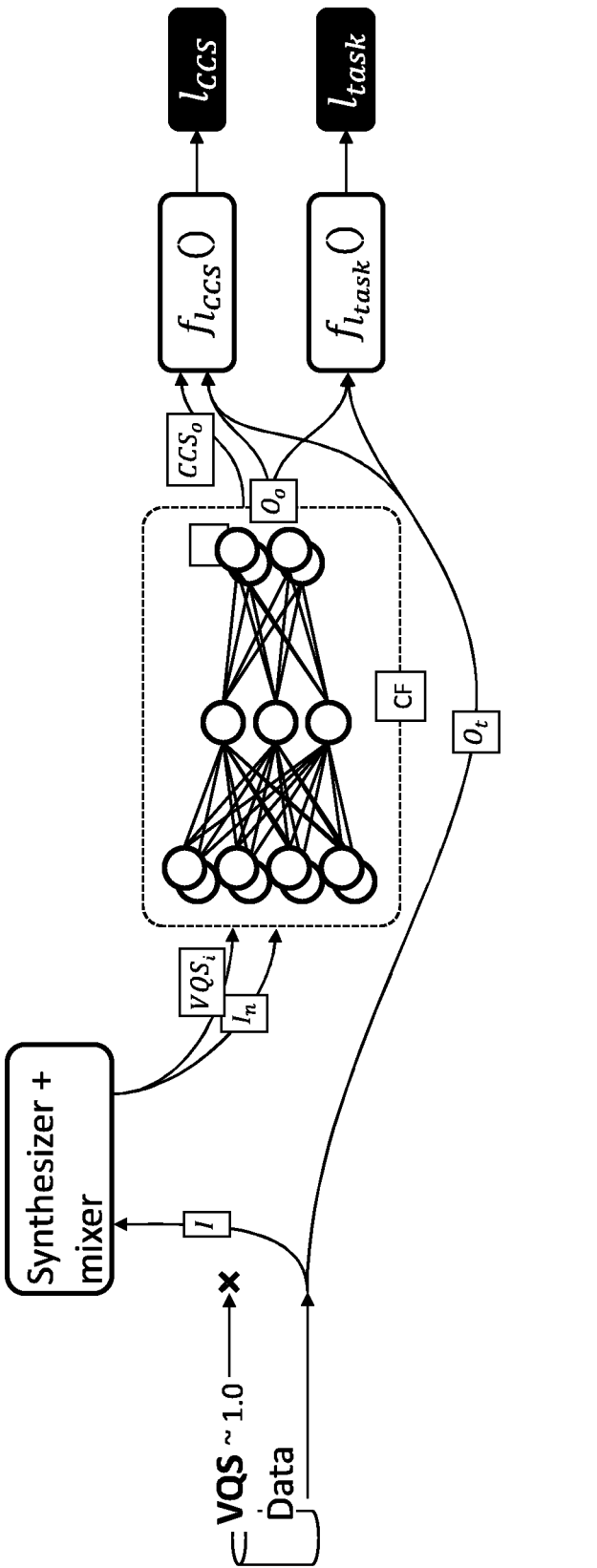
FIG. 6 shows a framework for training of a neural network to accept VQS as an input and estimate CCS values according to some example embodiments of the invention.

The two training procedures can be trivially combined to achieve the effect of a CF trained to both accept VQS and predict CCS values. The combined framework according to the example can be seen in FIG. 6. As shown in FIG. 6 (left end), training data having high dependability (VQS~1.0) are available. They are input into a synthesizer and mixer which adds noise to the training data to obtain noisy training data and determines a VQS for each of the noisy training data. The noisy training data and their VQS are input into the CF (e.g. neural network) which outputs a OCRS as $O_o$ output and a CCS as $CCS_o$ output. The outputs $O_o$ and $VQS_o$ from the CF are combined with the true output $O_t$ obtained from the training data having high dependability to calculate the respective losses $I_{CCS}$ and $I_{task}$ by the loss functions $f_{ltask}$ and $f_{lCCS}$. In this scenario, some of the most common loss functions which can be used are Mean Square Error (MSE), Mean Absolute Error (MAE), Huber loss, etc.

CCS Incorporation in the Process of Optimal Configuration Calculation

When a CF receives a request from the Controller, it sends [OCRS, UF, CCS] values to the Controller. The CCS value signifies how confident the CF is in its [OCRS, UF] values.

As soon as the Controller receives [OCRS, UF, CCS] from all the CFs, it checks for the CCS value in each [OCRS, UF] set. A low CCS value signifies that the CF is not quite confident about its own preferred configurations in the network state, and so if this [OCRS, UF] is considered in the configuration calculation process, this can result into a final configuration which is far from optimal for the system. So, e.g. before the system becomes operational, MNO decides on the threshold value, called CCS threshold (CT) and communicates this CT value directly to Controller. Of course, in some example embodiments, MNO may update CT during operation, too.

Every time Controller receives [OCRS, UF] sets from the CFs, the Controller checks the CCS value corresponding to each [OCRS, UF] set and discards those [OCRS, UF] sets whose CCS value is below CT. After that, the Controller calculates the corresponding CW values, the final optimal configuration and makes necessary changes in the network. Of course, as outlined hereinabove, instead of discarding (only) [OCRS, UF] having a CCS below CT, the controller may (additionally) discard other [OCRS, UF]. In some example embodiments, the controller may weigh [OCRS, UF] inputs with high CCS values higher than [OCRS, UF] inputs with lower CCS values. This might increase the computational complexity but might increase the accuracy of the prediction, too. In this context, discarding corresponds to weighing with a weight of 0.

Figure 7:
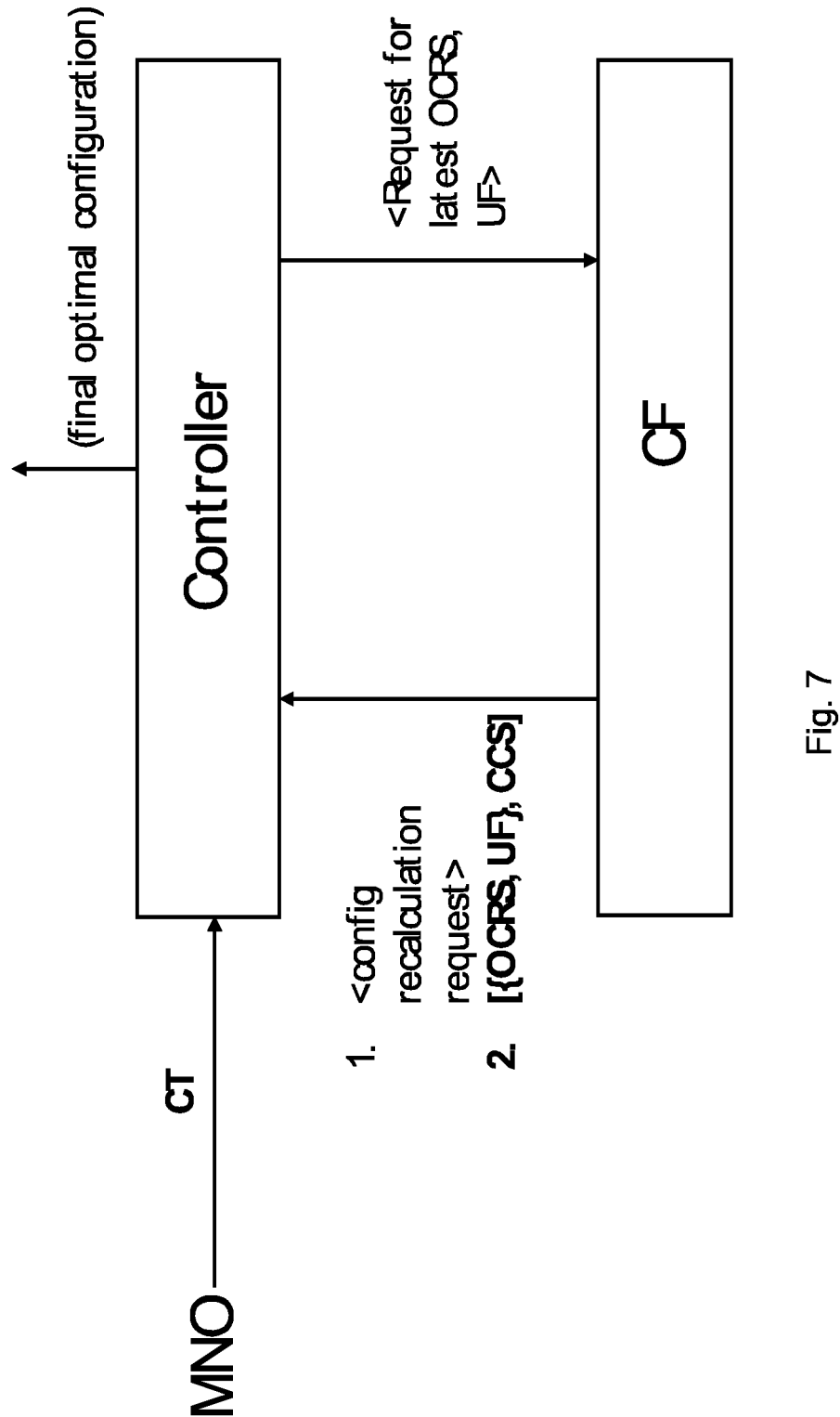
FIG. 7 shows interfaces of CF and controller according to some example embodiments of the invention.

FIG. 7 shows an example of the interfaces between CF, controller and MNO according to some example embodiments of the invention. The controller requests from CF the latest OCRS and UF. In response, CF calculates the set of {OCRS, UF}, and provides additionally a corresponding CCS indicating the confidence of the CF in the set of {OCRS, UF}. The controller receives from MNO a value of the threshold CT. The controller uses the received CCSs and CT to weigh (e.g. discard) the received set of {OCRS, UF}, and to calculated a final optimal (or nearly optimal) configuration (e.g. a new value of a control parameter p) based thereon. This configuration infers the network.

A main goal of some example embodiments of the invention is the mitigation of erroneous information propagation to (or from) CFs, through the communication of the VQS and CCS. This will improve robustness and the CAN system performance. In some example embodiments of the invention, VQS and/or CCS may be additionally used as follows:

A CF that accepts VQS values as alongside the (data) input can also implement the following functionality:

Automatic determination of the relevance of inputs: By artificially changing the quality of the input (as described in the previous section in training method 1, action 2), the change in accuracy can be measured on the output. From this, the relevance/contribution of the different inputs can be determined. This allows for:

The estimation of how much an input can degrade before it overtly disturbs the CF's precision. If an input is not (or hardly, less than a predefined threshold) relevant, it can even be completely pruned, and the communication of that data can be spared The recognition of critical inputs, which could improve the accuracy of the CF greatly if their VQS would be higher Correct handling of missing values: Being able to communicate VQS allows the CFs to handle missing values or completely missing records, by setting the confidence values to 0.0.

CCS may be used as a measure of dependability for the Controller. This interpretation of the CCS values allows for a variety of applications and benefits:

Automated second opinions: In critical CFs, which produce very impactful control decisions, CCS can be used to suppress suggestions ([OCRS, UF]) which have a low confidence. In these cases, a re-evaluation can be triggered, or a simpler fallback algorithm can be used.

Advanced re-training triggers: In some deployments, it may be foreseen, that CFs will be periodically re-trained because, as their operational context changes, the models become "stale". In some proposals, these re-trainings will be triggered ad-hoc, by measuring a degradation of the predictive power of the CF. With CCS, these triggers can be made more precise:

If "bad" predictions from the CF are accompanied by low CCS (low confidence), the model is aware of the changed context, and might not need retraining, provided the new context is temporary.

If "good" predictions from the model are accompanied by low CCS (low confidence), this could signify that the model is operating outside of its "comfort zone", and the good predictions might only be credited to luck. Re-training could be triggered in this case.

If a prediction is "bad" or "good" may be decided as follows, for example: Typically, following a CF's actions, the CF may receive feedback from the network about the quality of the actions (e.g. in the KPIs which change with the actions and whose values can be read from the network). A prediction may be considered to be bad if the feedback is negative (e.g. if the KPIs are degraded). A good prediction, on the other hand, is followed with improved feedback (e.g. improvements in KPI values).

Improved trust: Sometimes CFs struggle to gain foothold in determining values of critical configurations, because MNO is hesitant to leave highly impactful decisions, which can potentially cause a lot of damage to QoS (Quality of Service), to algorithms which are "opaque": ML algorithms are learning algorithms (as opposed to pre-programmed algorithms with a human-designed ruleset), which form their own ruleset during training, thus it is hard to explain "why" they made the decision that they did. This lack of trust could be lessened by the CCS; if MNO sees that in problematic situations, not only the MNO, but also the CF is not that confident in its decisions, this shared behavior could help in convincing MNO to better trust the CF.

Figure 9:
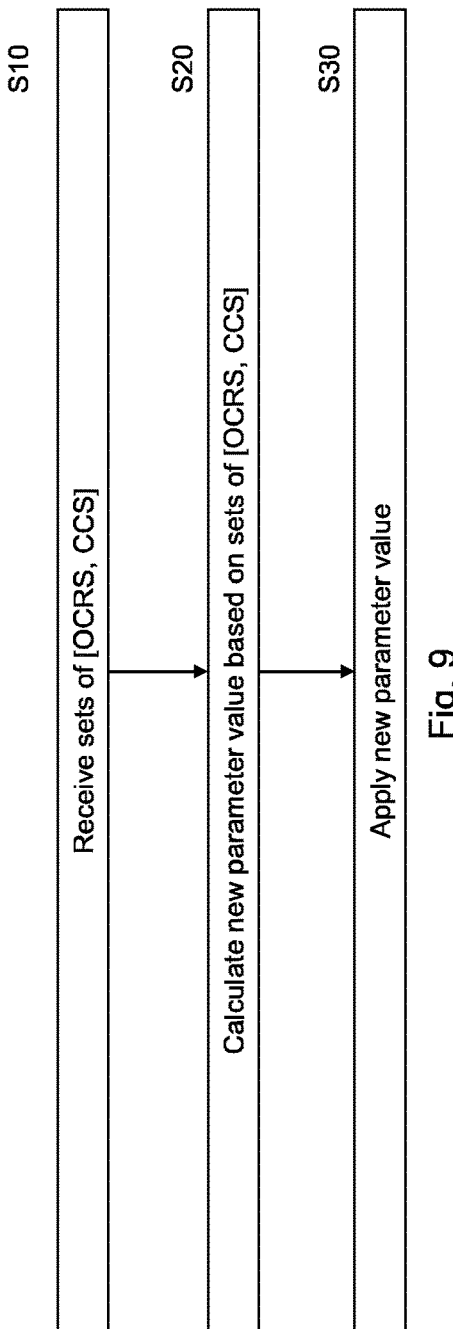
FIG. 9 shows a method according to an example embodiment of the invention.
Figure 8:
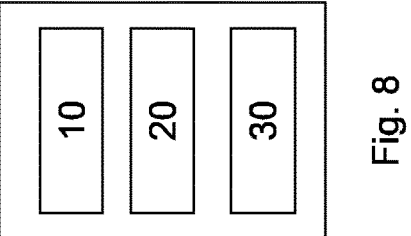
FIG. 8 shows an apparatus according to an example embodiment of the invention.

FIG. 8 shows an apparatus according to an example embodiment of the invention. The apparatus may be a controller, or an element thereof. FIG. 9 shows a method according to an example embodiment of the invention. The apparatus according to FIG. 8 may perform the method of FIG. 9 but is not limited to this method. The method of FIG. 9 may be performed by the apparatus of FIG. 8 but is not limited to being performed by this apparatus.

The apparatus comprises means for receiving 10, means for calculating 20, and means for applying 30. The means for receiving 10, means for calculating 20, and means for applying 30 may be a receiving means, calculating means, and applying means, respectively. The means for receiving 10, means for calculating 20, and means for applying 30 may be a receiver, calculator, and applicator, respectively. The means for receiving 10, means for calculating 20, and means for applying 30 may be a receiving processor, calculating processor, and applying processor, respectively.

The means for receiving 10 receives from each of plural cognitive functions a set of a respective OCRS and a respective CCS (S10). The CCS represents a confidence score of the respective OCRS. The OCRS is for a control parameter of a system.

Based on the received OCRSs and the CCSs, the means for calculating 20 calculates a new value for the control parameter (S20). For example, the CCSs may be used to weigh the OCRS. Weighing may include discarding some of the OCRSs.

The means for applying (30) applies the new value of the control parameter to the system (S30).

Figure 11:
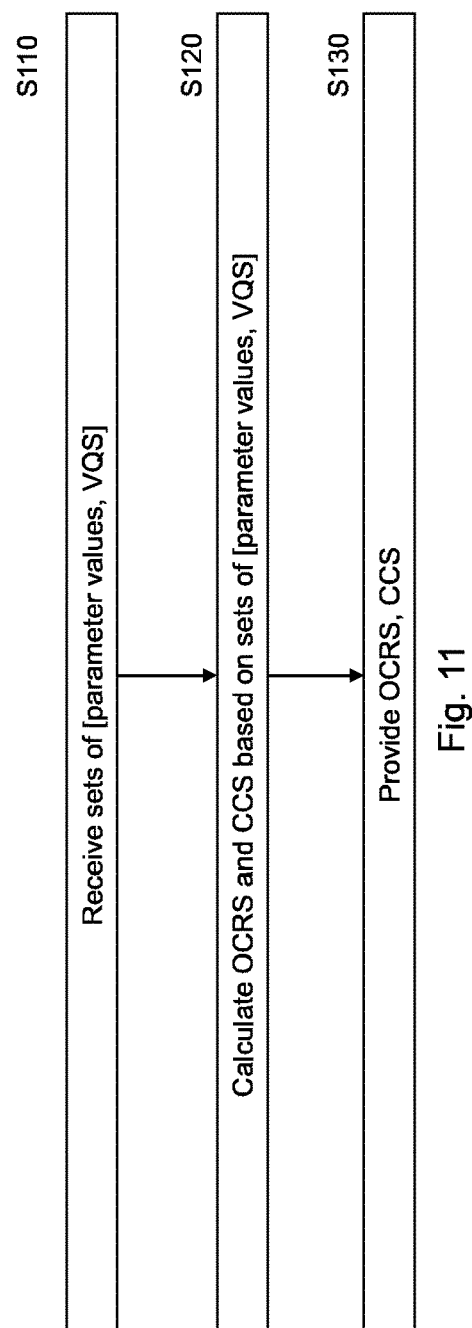
FIG. 11 shows a method according to an example embodiment of the invention.
Figure 10:
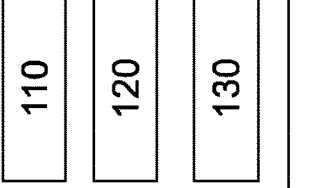
FIG. 10 shows an apparatus according to an example embodiment of the invention.

FIG. 10 shows an apparatus according to an example embodiment of the invention. The apparatus may be a cognitive function, or an element thereof. FIG. 11 shows a method according to an example embodiment of the invention. The apparatus according to FIG. 10 may perform the method of FIG. 11 but is not limited to this method. The method of FIG. 11 may be performed by the apparatus of FIG. 10 but is not limited to being performed by this apparatus.

The apparatus comprises means for receiving 110, means for calculating 120, and means for applying 130. The means for receiving 110, means for calculating 120, and means for applying 130 may be a receiving means, calculating means, and applying means, respectively. The means for receiving 110, means for calculating 120, and means for applying 130 may be a receiver, calculator, and applicator, respectively. The means for receiving 110, means for calculating 120, and means for applying 130 may be a receiving processor, calculating processor, and applying processor, respectively.

The means for receiving 110 receives one or more received data sets (S110). Each of the received data sets comprises data each representing a value of a respective status parameter of a system. At least one of the data sets comprises a respective VQS representing a quality of the value of the respective status parameter.

The means for calculating 120 calculates a OCRS and a CSS of the OCRS based on the one or more received data sets (S120). The calculation is made by a cognitive function. The CCS represents a confidence score of the OCRS.

The means for providing 130 provides the calculated OCRS and the CSS to a controller, preferably to a controller of the system. Typically, S110 to S130 are performed upon receipt of a request for a OCRS from the controller, and the means for providing provides the OCRS and the CSS in response to the request.

Figure 12:
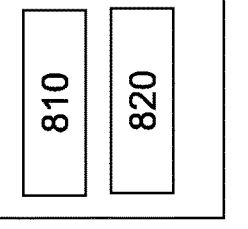
FIG. 12 shows an apparatus according to an example embodiment of the invention.

FIG. 12 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform at least one of the methods according to FIGS. 9 and 11 and related description.

Some example embodiments of this invention are particularly useful for the operation of Network Automation Functions (NAF) in mobile networks. Some example embodiments are explained with respect to a 5G network (NR). However, the invention is not limited to 5G. It may be used in other networks, too, e.g. in former or forthcoming generations of 3GPP networks such as 4G, 6G, 7G, etc. It may be used in any wireless (mobile) and wireline communication networks. It may be used even outside of communication networks in a system where CFs act as agent of a controller to autonomously influence the configuration of the system. An example of the latter is factory automation. A "network" is a particular case of a "system".

Some example embodiments of the invention are described where the controller uses EG optimization in order to recalculate a control parameter value. However, the invention is not limited to EG optimization. Other optimization algorithms may be used instead.

Some example embodiments are described where the CFs provide a OCRS and a UF. However, in some example embodiments, the UF may be omitted. In such example embodiments, the controller calculates the (nearly) optimal configuration based on the OCRSs only.

In some example embodiments, the noise used in the training of the CF may be added or subtracted. However, in some example embodiments, the noise and the calculated value of the configuration parameter may undergo another arithmetic operation such as a multiplication or division (in this case, the noise has a value ~1).

The CF is not restricted to a neural network, and the training of the neural network, if any, is not restricted to CSD. Other implementations and/or different training approaches are feasible, too.

One piece of information may be transmitted in one or plural messages from one entity to another entity. Each of these messages may comprise further (different) pieces of information.

Names of network elements, network functions, protocols, and methods are based on current standards. In other versions or other technologies, the names of these network elements and/or network functions and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be deployed in the cloud.

According to the above description, it should thus be apparent that example embodiments of the present invention provide, for example, a controller, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a cognitive function, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Each of the entities described in the present description may be embodied in the cloud.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus for controlling a Cognitive Autonomous Network (CAN) system, the apparatus comprising:
   one or more processors; and
   a non-transitory computer storage medium storing instructions that, when executed by the one or more processors, cause the apparatus to perform:
      determining, based on a control-loop monitoring condition, a recalculation is required for a transmit power (TXP) control parameter of the CAN system;
      based on the determination, transmitting, to each of a plurality cognitive functions including a mobility load balancing (MLB) cognitive function and a coverage and capacity optimization (CCO) cognitive function, a request for a respective optimal configuration range set and a respective utility function (UF), wherein each request elicits a confidence score for the respective optimal configuration range set and UF;
      based on the transmitted request, receiving, for the TXP control parameter of the CAN system, from each of the plurality cognitive functions, a plurality of sets, each set of the plurality of sets comprising the respective optimal configuration range set, the respective UF, and a respective confidence score the confidence score being generated by the respective cognitive function during inference based at least in part on Value Quality Scores (VQS) associated with input measurements used by that cognitive function;
      calculating a new value for the TXP control parameter by:
   generating a filtered plurality of sets from the received plurality of sets by:
   discarding any received respective set whose respective confidence score is below a first predefined threshold received from a Mobile Network Operator (MNO);
   identifying, from any remaining sets, a set having a lowest confidence score; and
   discarding the identified set if the lowest confidence score is below a second predefined threshold, to generate a filtered plurality of sets;
   calculating the new value by weighting the respective optimal configuration range sets and the respective UFs according to their corresponding confidence score values from the filtered plurality of sets; and
   applying a configuration update to one or more network elements of the CAN system based on the new value of the TXP control parameter.

2. The apparatus according to claim 1, wherein calculating the new value further comprises weighting each of the respective optimal configuration range sets in the filtered plurality of sets based on the respective confidence score of each set.

3. An apparatus for controlling a Cognitive Autonomous Network (CAN), the apparatus comprising:
   one or more processors, and
   a non-transitory computer storage medium storing instructions that, when executed by the one or more processors, cause the apparatus to perform:

receiving one or more data sets, wherein each of the received one or more data sets comprises data each representing a value of a respective status parameter of the CAN, and at least one of the data sets comprises a respective value quality score, (VQS) representing a quality of the value of the respective status parameter, the VQS being a normalized mutual-information value bounded between 0.0 and 1.0, wherein 1.0 indicates a perfect measurement and 0.0 indicates missing or noisy data;

calculating, by a cognitive function implemented as a neural-network-based model, an optimal configuration range set and a confidence score of the optimal configuration range set based on the received one or more data sets including the VQS, wherein the confidence score represents a dependability of the optical configuration range set and is learned to correlate with a true mutual-information value between predicted and ground-truth outputs; and providing the calculated optimal configuration range set and the confidence score to a controller, wherein the controller uses the confidence score to discard optical configuration range sets values having the confidence score below a predetermined threshold;

wherein the cognitive function is a trained model generated by a training process comprising:

storing plural training data sets having VQS values greater than 0.95;

generating plural respective noisy training data sets by adding a respective amount of noise to the training data sets, the noise being Gaussian-distributed or generated by a Generative Adversarial Network (GAN);

determining a respective VQS for each of the noisy training data sets, the respective VQS is determined based on the respective amount of noise added; and training the cognitive function based on the noisy training data sets and their determined VQS values, wherein the cognitive function is conditioned to process the VQS as an input and to output the optimal configuration range set and the confidence score, the training minimizing a combined loss comprising a task loss and a mean-squared-error loss between the confidence score and the mutual-information value.

4. The apparatus according to claim 3, wherein the instructions, when executed by the one or more processors, further cause the apparatus to perform:

receiving, from the controller, a request to provide the optimal configuration range set for a control parameter of a system; and providing the calculated optimal configuration range set and the confidence score in response to the request from the controller.

5. The apparatus according to claim 4, wherein the instructions, when executed by the one or more processors, further cause the apparatus to perform:

calculating a utility function along with the calculating of the optimal configuration range set and the confidence score based on the received one or more data sets; and providing the utility function in response to the request from the controller.

6. The apparatus according to claim 3, wherein the instructions, when executed by the one or more processors, further cause the apparatus to perform:

determining a need to retrain the cognitive function based on a value of the confidence score.

7. A method for controlling a Cognitive Autonomous Network (CAN) system, the method comprising:

determining, by a controller of the CAN system and based on a control-loop monitoring condition, a recalculation is required for a transmit power (TXP) control parameter of the CAN system;

based on the determination, transmitting by the controller of the CAN system, to each of a plurality cognitive functions including a mobility load balancing (MLB) cognitive function and a coverage and capacity optimization (CCO) cognitive function, a request for a respective optimal configuration range set and a respective utility function (UF), wherein each request elicits a confidence score for the respective optimal configuration range set and UF;

based on the transmitted request, receiving, by the controller of the CAN system, for the TXP control parameter of the CAN system, from each of the plurality cognitive functions, each set of a plurality of range sets comprising the respective optimal configuration range set, the respective UF, and a respective confidence score the confidence score being generated by the respective cognitive function during inference based at least in part on Value Quality Scores (VQS) associated with input measurements used by that cognitive function;

calculating, by the controller of the CAN system, a new value for the TXP control parameter by:

generating a filtered plurality of range sets from respective range sets of the plurality of range sets by:

discarding any received respective range set whose respective confidence score is below a first predefined threshold received from a Mobile Network Operator (MNO);

identifying, from any remaining range sets, a range set having a lowest confidence score;

discarding the identified range set based on the lowest confidence score being below a second predefined threshold to generate a filtered plurality of sets; and weighting the respective optimal configuration range sets and the respective UFs according to their corresponding confidence score values from the filtered plurality of sets; and aggregating one or more of non-discarded optimal configuration range sets; and applying, by the controller of the CAN system, a configuration update to one or more network elements of the CAN system based on the new value of the TXP control parameter.

8. The method according to claim 7, wherein calculating the new value further comprises weighting each of the respective optimal configuration range sets in the filtered plurality of sets based on the respective confidence score of each set.

* * * * *